(12) United States Patent
Saleem

(10) Patent No.: US 11,461,627 B2
(45) Date of Patent: Oct. 4, 2022

(54) SYSTEMS AND METHODS FOR TRAINING AND CONTROLLING AN ARTIFICIAL NEURAL NETWORK WITH DISCRETE VEHICLE DRIVING COMMANDS

(71) Applicants: VOLKSWAGEN AG, Wolfsburg (DE); PORSCHE AG, Stuttgart (DE); AUDI AG, Ingolstadt (DE)

(72) Inventor: Muneeb Saleem, Foster City, CA (US)

(73) Assignees: Volkswagen AG; Audi AG; Porsche AG

( * ) Notice: Subject to any disclaimer, the term of this patent is extended or adjusted under 35 U.S.C. 154(b) by 451 days.

(21) Appl. No.: 15/827,982

(22) Filed: Nov. 30, 2017

(65) Prior Publication Data
US 2019/0164051 A1    May 30, 2019

(51) Int. Cl.
| | | |
|---|---|---|
| *G06N 3/08* | (2006.01) | |
| *G05D 1/00* | (2006.01) | |
| *G06K 9/62* | (2022.01) | |
| *G06N 3/04* | (2006.01) | |
| *G05D 1/02* | (2020.01) | |
| *G06N 3/00* | (2006.01) | |
| *B60W 30/00* | (2006.01) | |
| *G06V 10/147* | (2022.01) | |

(52) U.S. Cl.
CPC ............... *G06N 3/08* (2013.01); *B60W 30/00* (2013.01); *G05D 1/0088* (2013.01); *G05D 1/0221* (2013.01); *G06K 9/6256* (2013.01); *G06N 3/00* (2013.01); *G06N 3/0445* (2013.01); *G06V 10/147* (2022.01); *G05D 2201/0213* (2013.01)

(58) Field of Classification Search
CPC .......... G06N 3/08; G06N 3/00; G06N 3/0445; B60W 30/00; G05D 1/0088; G05D 2201/0213; G05D 1/0221; G05D 2201/021; G06K 9/209; G06K 9/6256
See application file for complete search history.

(56) References Cited

U.S. PATENT DOCUMENTS

2019/0113917 A1 *    4/2019    Buch ................... G06N 3/0454

OTHER PUBLICATIONS

Mariusz Bojarski, Davide Del Testa, Daniel Dworakowski, Bernhard Firner, Beat Flepp, Prasoon Goyal, Lawrence D. Jackel, Mathew Monfort, Urs Muller, Jiakai Zhang, Xin Zhang, Jake Zhao, Karol Zieba, "End to End Learning for Self-Driving Cars", NVIDIA Corporation, Apr. 2016, pp. 1-9 (Year: 2016).*
Andreu Catala, Antoni Gau, Bernardo Morcego, Josep M. Fuertes, "A Neural Network Texture Segmentation System for Open Road Vehicle Guidance", Department ESA,pp. 247-252, 1992. (Year: 1992).*

(Continued)

*Primary Examiner* — Eric Nilsson
(74) *Attorney, Agent, or Firm* — Barnes & Thornburg, LLP

(57) ABSTRACT

Systems, devices, and methodologies are provided for training and controlling a neural network. The neural network is trained using definitive and random training modes to train neurons in a monolithic network. The neural network output is used to control an autonomous or semi-autonomous vehicle.

7 Claims, 6 Drawing Sheets

(56) References Cited

OTHER PUBLICATIONS

Jesus Muńoz-Bulnes, Carlos Fernandez, Ignacio Parra, David Fernăndez-Llorca, Miguel A. Sotelo, "Deep Fully Convolutional Networks with Random Data Augmentation for Enhanced Generalization in Road Detection", 2017 IEEE 20th International Conference on Intelligent Transporation Systems, 366-371. (Year: 2017).*

Bojarski, Mariusz, et al. "End to end learning for self-driving cars." arXiv preprint arXiv:1604.07316 (2016). (Year: 2016).*

Mahmud, Firoz, Al Arafat, and Syed Tauhid Zuhori. "Intelligent autonomous vehicle navigated by using artificial neural network." 2012 7th International Conference on Electrical and Computer Engineering. IEEE, 2012. (Year: 2012).*

Pomerleau, Dean A. "Efficient training of artificial neural networks for autonomous navigation." Neural computation 3.1 (1991): 88-97. (Year: 1991).*

Hubschneider et al.; Adding Navigation to the Equation: Turning Decisions for End-to-End Vehicle Control; 2017 IEEE 20th International Conference on Intelligent Transportation Systems (ITSC); IEEE; Oct. 16, 2017; pp. 1-8.

Search Report and Written Opinion for International Patent Application No. PCT/EP2018/082782; dated Apr. 15, 2019.

* cited by examiner

SYSTEMS AND METHODS FOR TRAINING AND CONTROLLING AN ARTIFICIAL NEURAL NETWORK WITH DISCRETE VEHICLE DRIVING COMMANDS

BACKGROUND

The present disclosure relates to systems, components, and methodologies for using an artificial network in autonomous driving. In particular, the present disclosure relates to training an artificial neural network and controlling a vehicle using the trained artificial neural network.

SUMMARY

According to the present disclosure, an end-to-end artificial neural network is provided that has a single model.

In accordance with at least one embodiment, the single model is trained in definitive and neutral commands to more smoothly control a vehicle maneuver.

In accordance with at least one embodiment the definitive commands may be forward, left and right turn commands that are input into the model along with respective forward, left, and right maneuvers executed by a vehicle driver. The neutral commands may be a plurality of neutral commands that are input in the model along with randomly selected forward, left and right turn maneuvers executed by the vehicle driver. In this manner, the neutral commands are input to induce "confusion" into the neural network during training. In accordance with at least one embodiment, the maneuvers are input in real-time via sensors on the vehicle.

The neural network may be trained so that it can determine right, left, or forward trajectories at upcoming intersections. The neural network may be further configured to process navigational inputs such as voice commands or mapped route guidance by mapping them to particular spatial coordinates. The neural network may control a command controller so that a command is output to a vehicle component to execute the predicted trajectory at the intersection.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 6A:
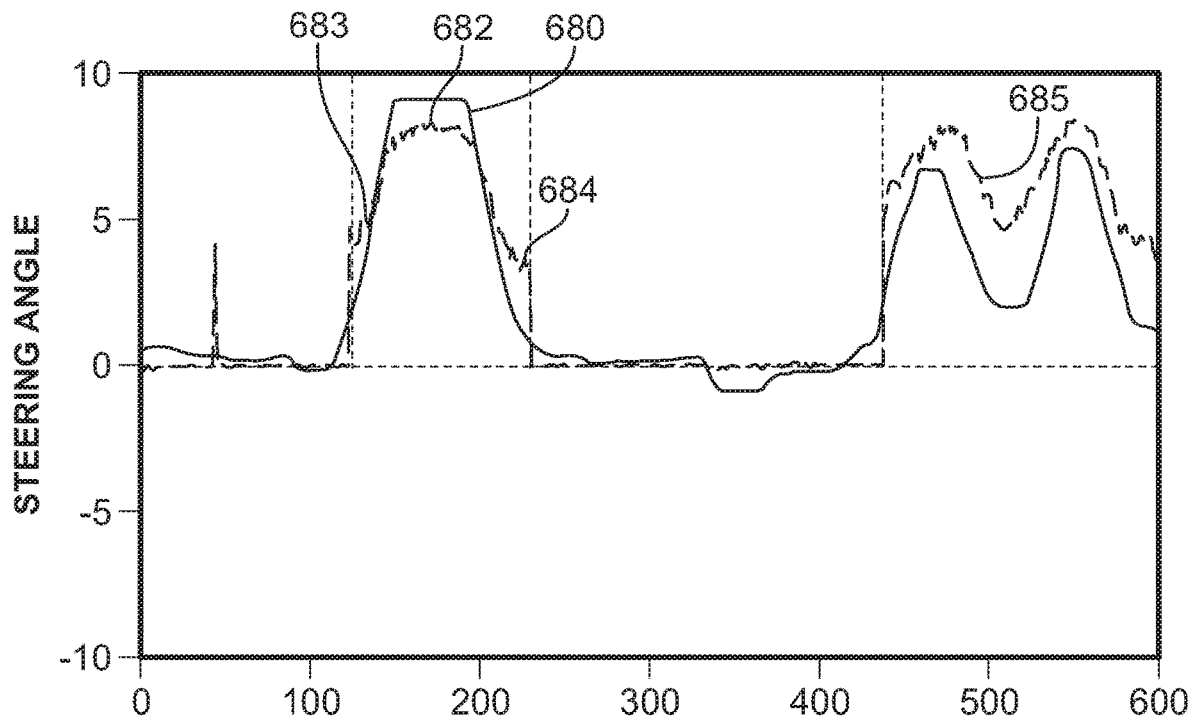
Figure 6B:
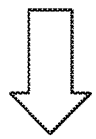
Figure 6B:
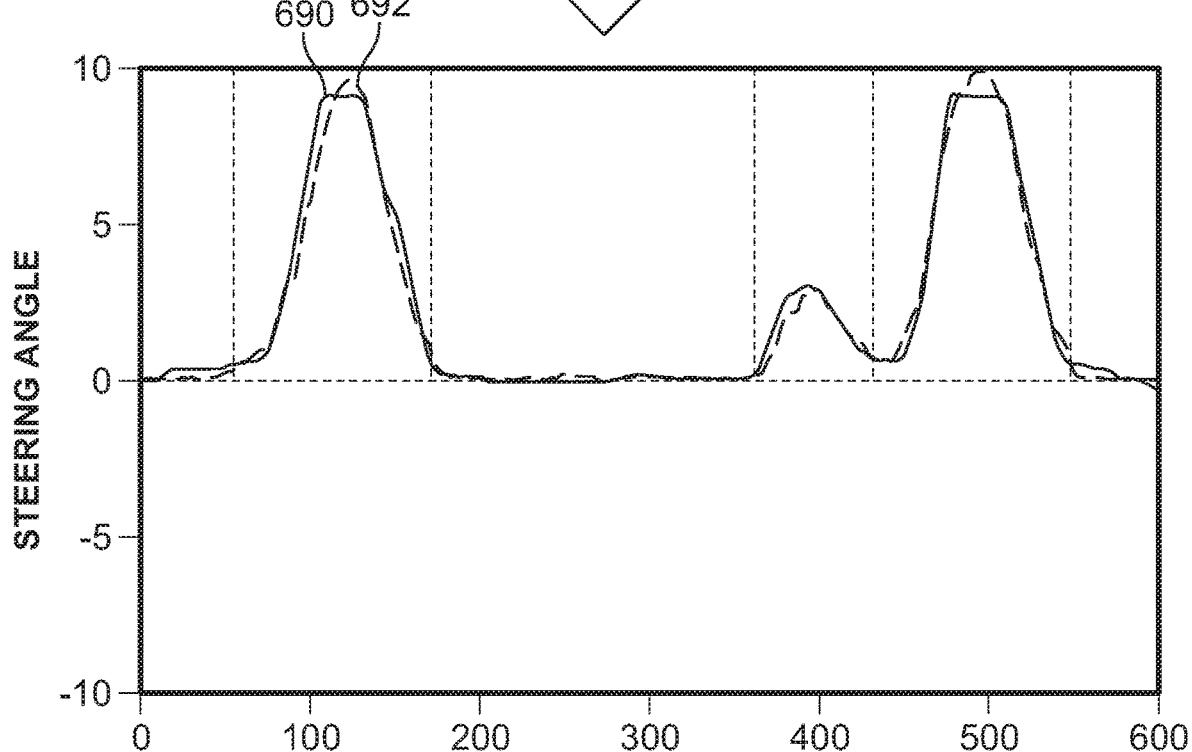

FIG. 6A is an illustration of an exemplary steering angle over time for a human driver compared with an autonomous vehicle having a neural network that is trained only in definitive commands; and FIG. 6B is an illustration of an exemplary steering angle over time for a human driver compared with an autonomous vehicle having a neural network that is trained in definitive and confusion induce commands

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
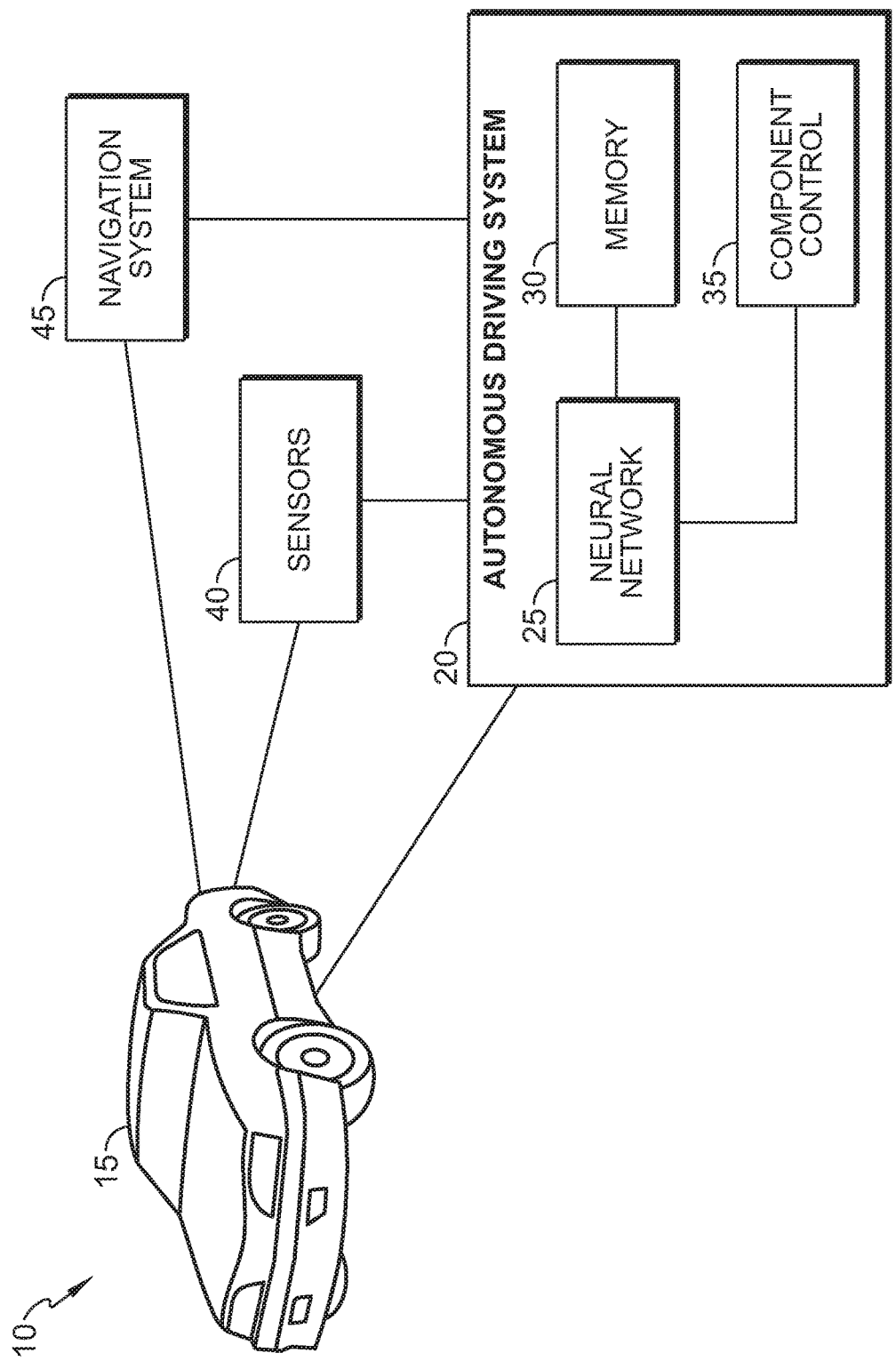
FIG. 1 is a schematic and diagrammatic illustration of a vehicle control system including sensors and inputs to an autonomous driving system having a neural network and command controller output to execute driving maneuvers.
Figure 2:
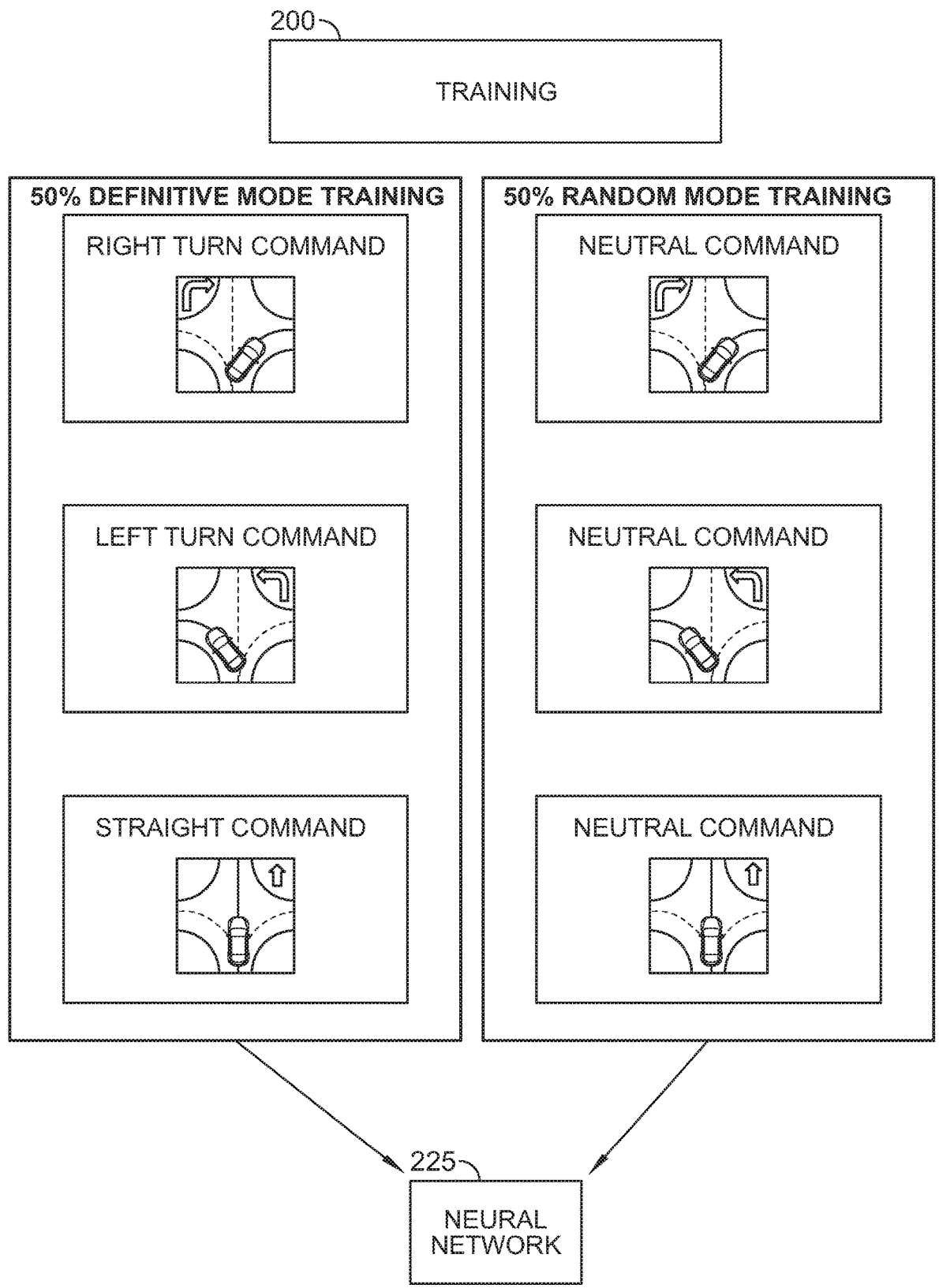
FIG. 2 is a block diagram of a training regime for training the neural network of FIG. 1 to identify driving trajectories and predict driving maneuvers.

FIG. 1 is a schematic and diagrammatic view of an exemplary vehicle control system 10. According to FIG. 1, a vehicle 10 may include an autonomous driving system 20 including a neural network 25, a local storage or memory 30, and a component controller 35 implemented in part using one or more computer processors. Vehicle 15 may further include sensors 40, such as camera or video sensors, coupled to the vehicle to capture data about the environment surrounding the vehicle and communicate the captured data to the neural network. Vehicle 15 may also include a navigation system 45 including one or more computer processors running software configured to capture global positioning data and communicate navigational data to the vehicle neural network 25. Neural network 25 may be trained in using real-time and/or stored driving maneuver data along with commands as described further in FIG. 2 resulting in smooth human-like maneuverability of the vehicle 15 in response to outputs from the component controller 35. During training, the data and command inputs alternatively may not be in 'real-time'. The commands plus imagery data can be stored on disk and processed repetitively until model is trained.

Figure 3:
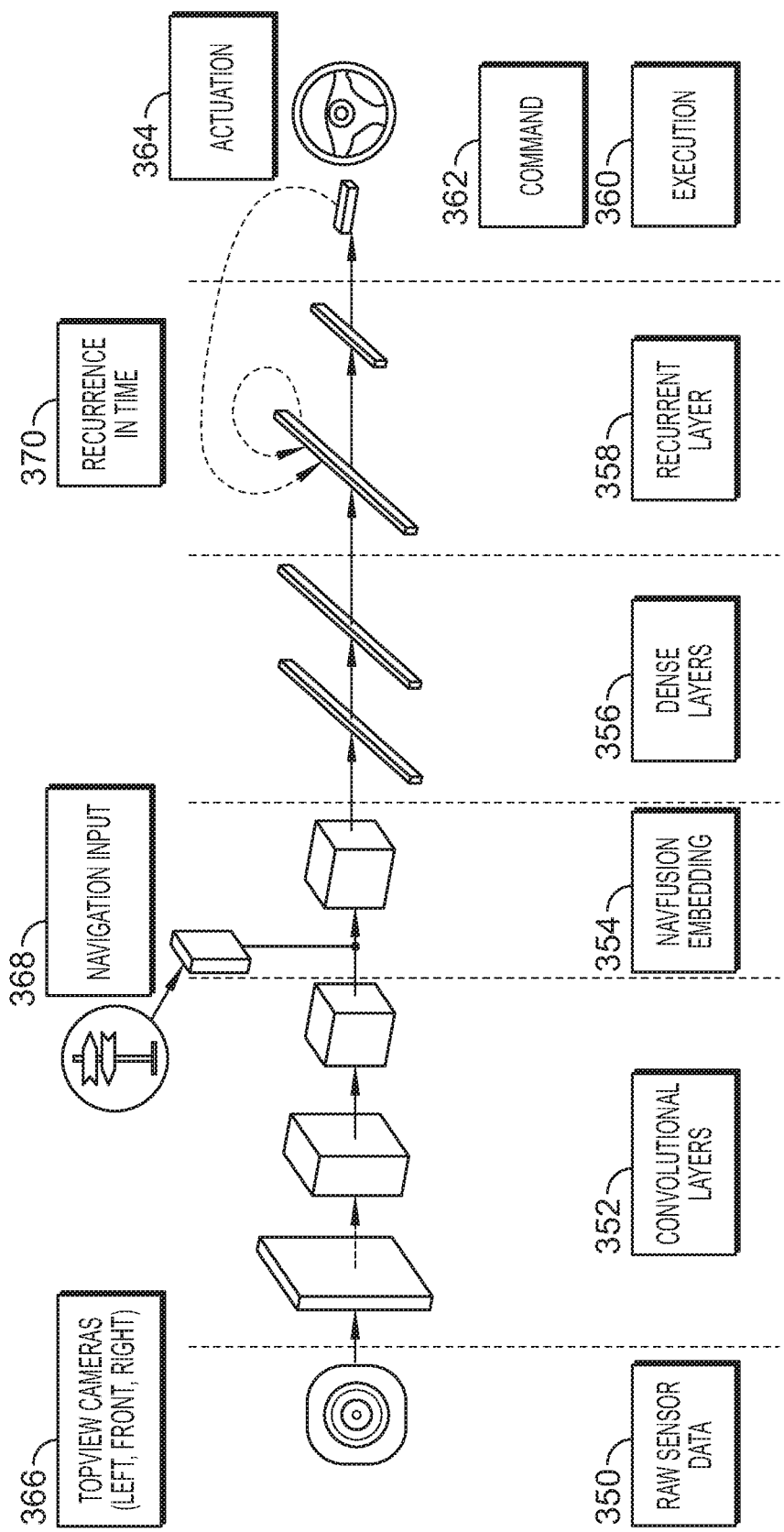
FIG. 3 is a schematic and diagrammatic illustration of an end-to-end neural network of FIG. 1.

A neural network 225 may be a single model end-to-end neural network as described in FIG. 3. Neural network training 200 may include two modes of training, definitive mode, 230 and random mode 232. In each mode, the network is trained on the same trajectories of straight, right, and left, with different definitive and neutral input commands. In definitive mode training 230, a plurality of definitive commands is provided as an input to the neural network along with corresponding definitive driving maneuver data. For example, a discrete definitive command may be a right turn command 234 that is input along with right turn sensor data 236 for an approaching intersection. Another definitive command may be a left turn command 238 that is input with left turn sensor data 240 for an approaching intersection. Another definitive command may be a straight command 242 and straight sensor data 244 for an approaching intersection. The sensor data may be image data selected and input from stored historic data sets of known driving maneuvers. Alternatively, the sensor data may be image data collected in real time during manual driving of the vehicle that includes the neural network 225.

In random mode training, a neutral mode command is provided as an input to the neural network 225 along with corresponding randomly selected driving data, the driving data corresponding to straight, right turn, and left turn data as was used in definitive commands training. For example, the random command may be a neutral command 246 that is input along with right turn sensor data 248 for an approaching intersection.

In this mode, the neutral command 246 may also be input along with left turn sensor data 250 for an approaching intersection. The neutral command may also be input along with straight sensor data 252 for an approaching intersection. In this manner in random mode, the network is trained in the overall dynamics of driving under all valid maneuvers, while still maintaining control over which trajectory or maneuver to choose. While the control input is in random training mode, the neural network is allowed to learn the possible valid maneuvers in each driving situation due to the random mode simply being a mix of all the other definitive commands. In this manner, the neural network learns to follow the free space in the road, and avoid obstacles.

Since the neural network model is monolithic, the command inputs flow through the same computational graph, and therefore, lessons learned in random mode training are shared with the other definitive command modes as well. Due to the monolithic nature and induced confusion means provided by the random mode and with unique random commands, such as neutral command inputs, some of the neurons in the network automatically learning to detect features in the images that are crucial to safe navigation, such as open spaces in the random mode. According to this embodiment, the neural network 225 receives 50% of its training in definitive mode training 230 and 50% of its training in random mode training. However, the percentage of time in each training mode may vary depending on the dataset used and driving scenarios the network is being trained for.

An illustrative embodiment of the real-time, end-to-end processing of the neural network 300 is shown in FIG. 3. Sensor data 350 may be captured and input from a plurality of optical sensors such as cameras 366 configured to capture at least left, front, and right images relative to the exterior of the vehicle. These inputs may be fed into convolutional layers 352 of the network. Optionally, NavFusion embedding 354 of input from a navigational system 368 may be added to the convolutional image output. Each voice command or guidance given by a navigation system may be mapped according to the semantic mapping described in FIGS. 4-5, and fed, directly, into the neural network.

Dense layers 356 predict the vehicle command (left, right straight), and recurrent layers 358 may determine the time-series of the collected data as part of a feedback loop 370 with the command controller 362 which outputs the command and drives execution 360 of a vehicle component 364. In this illustrative embodiment, the component 364 is a steering wheel and the recurrent layers 358 utilize long and short term memory, the real-time continuous input of images, and the real-time command controller 362 output to adjust the steering wheel angle over time throughout the execution of the turn maneuver.

During deployment of the trained neural network, the vehicle can be operated in the random mode for prolonged periods of time. The mode of operation may be input by a user via a user interface such as a keyboard, touchscreen, or vehicle interface. Sensors are active and capture images or other data indicative of the vehicle surroundings. During this time, the vehicle executes all the discrete maneuvers it has been trained on when each of them becomes relevant and safe/valid to execute. For example, if the vehicle is inside a parking lot in random mode, it will keep going straight until it reaches a turn or intersection, at which point it will randomly choose a maneuver it has been trained on, and execute that maneuver if feasible. For example, if the vehicle chooses to execute a left turn driving maneuver at the intersection, it can then drive as if in straight definitive mode until it reaches another turn or intersection. In this manner, the vehicle avoids curbs and obstacles, and allows the neural network to produce trajectories which are a combination of the definitive commands it has been trained on. The network may use lessons learned across different definitive training sessions together in a single driving control/command mode. The network deployed in the command mode can make a trajectory determination using a minimum of a single captured image.

Figure 4:
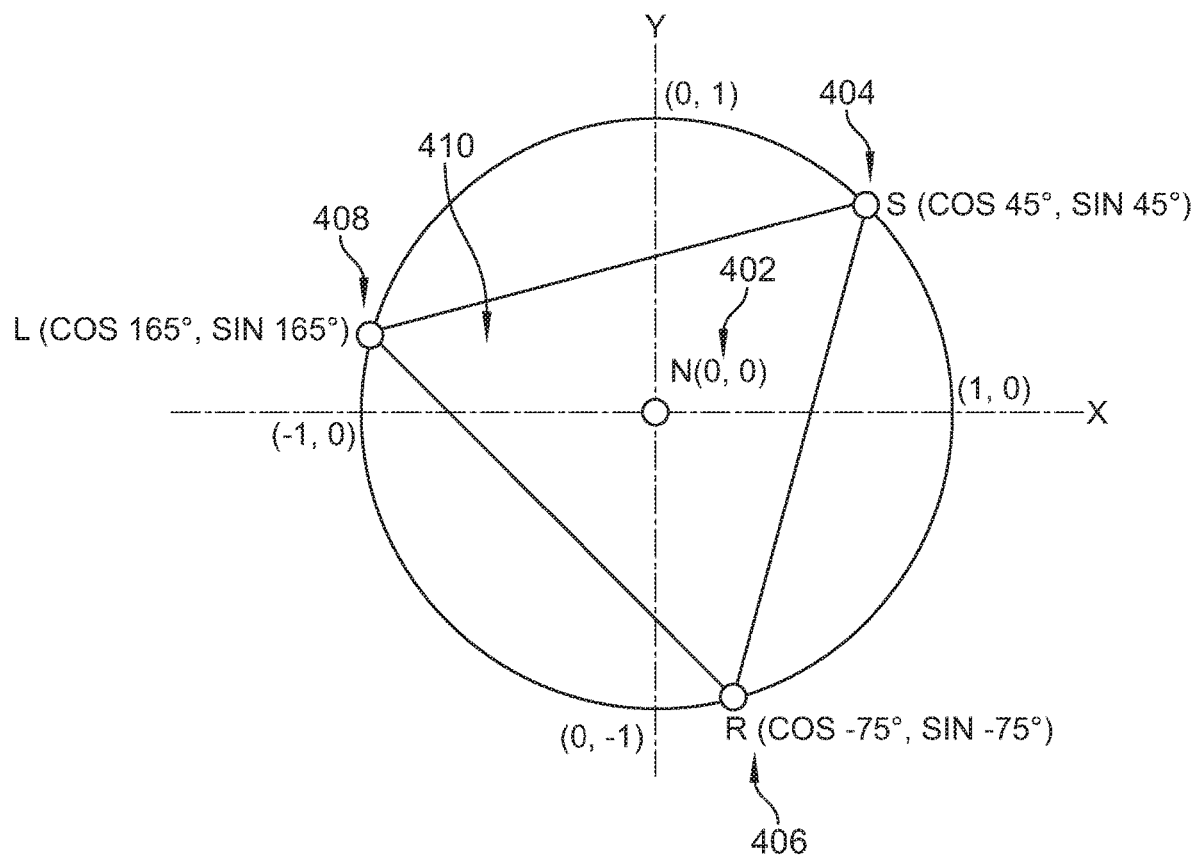
FIG. 4 is an illustration of exemplary two-dimensional model of a mapping of neural network commands for the neural network according of FIG. 1 including straight, right, left, and neutral, and their relative polarity and distance from neutral in the plane.

FIG. 4 illustrates the two-dimensional relationship of the neutral command to each of the right, left and straight commands so that they are suitable numerical inputs for the neural network. The neutral command 402 is at the origin point (0, 0). As can be seen each of straight command 404, left command 408 and right command 406 are located on a unit circle forming a triangle 410. The coordinates for each definitive command 404, 406, and 408 are chosen so that their polarities are distinct, thereby helping the neural network to learn and associate polarities with the definitive command. For example, straight command coordinates are both positive (+,+), right command 406 coordinates are positive, negative (+,−) and left command 408 coordinates are negative, positive (−,+). Neutral command (0,0) has no polarity and is symmetrically at the center of the triangle as it is the combination of all three definitive commands represented by the vertices of the triangle.

Figure 5:
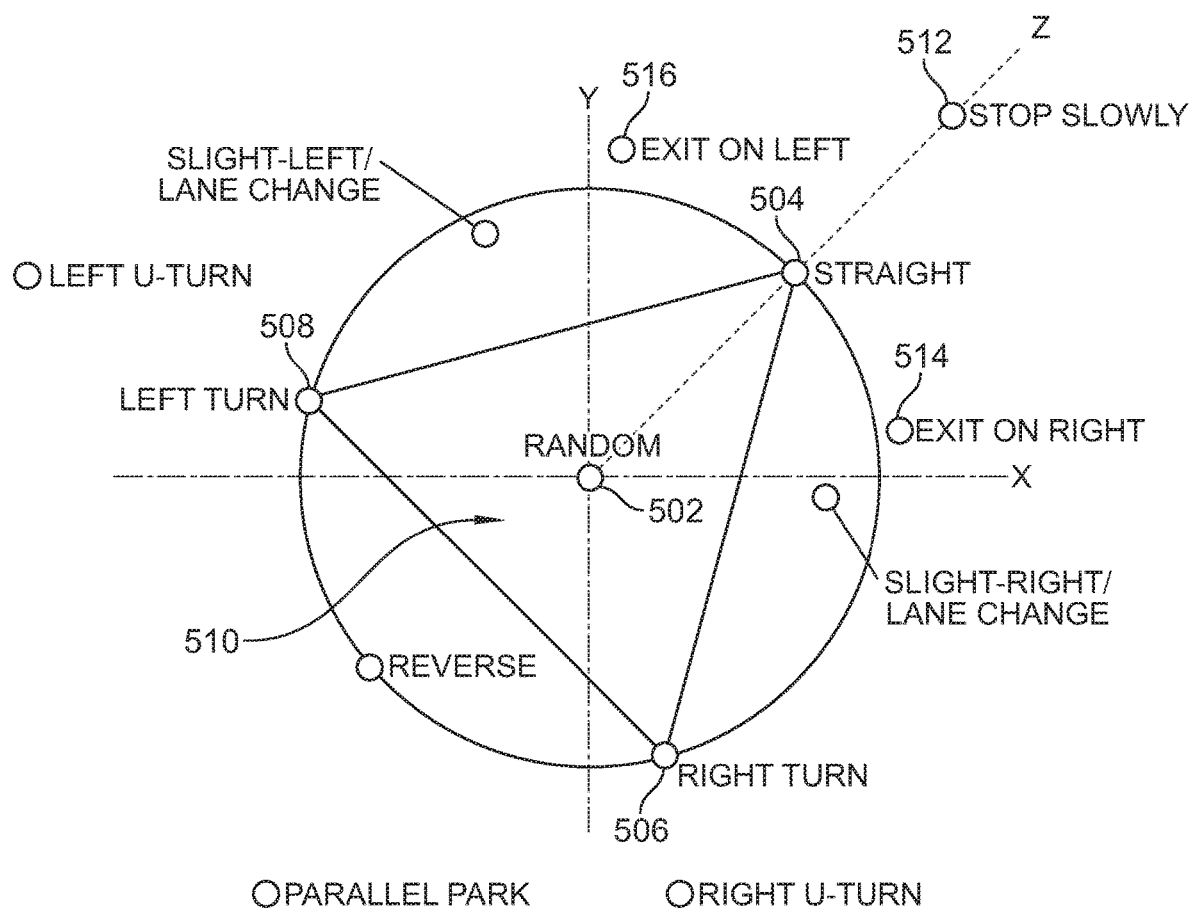
FIG. 5 is an illustration of an exemplary three-dimensional model of a semantically-sensitive mapping of neural network commands for the neural network according of FIG. 1 including straight, right, left, and neutral, their relative polarity as well as secondary commands and their relative coordinates and distance from neutral in the planes.

FIG. 5 illustrates how mapping the four commands of FIG. 4, can be extended to semantically sensitive numerical mapping of additional commands to number sequences. As can be seen, similar commands are close to each other in the embedding space. For example, exit left 516 may lie between straight command 504 and left turn command 508 (90 degrees from straight), but closer to straight command 504 depending on the angle of the exit. In this manner, relative degrees of turns between 0 degrees and a 90 degree turn can be defined. Likewise exit right 514 may lie between straight command 404 and right turn 406. An optional third dimension "z" may be added to show relationship s including braking and accelerating driving maneuvers. For example, stop slowly 512 may lie in the z-plane indicative of the rate of deceleration and smooth transition to a stopped state.

FIGS. 6A-6B illustrate how the neural network of this disclosure and the use of the random training command results in driving maneuvers that more closely resemble smooth human driving trajectories. For example, FIG. 6A depicts how the neural network may behave through turning steering angles over time 682 when the neural network has not been trained with the neutral mixed command. Compared with the human manual trajectory 680 for the same steering angles maneuvers, the neural network driven vehicle exhibits abrupt turning behaviors 683, 684 and inability to transition fully and smoothly 685. This is due to the strong data correlation between the definitive commands and outputs that occur. By way of contrast in FIG. 6B, the human trajectory 690 is closely followed by the neural network driven vehicle trajectory 692. Vertical dashed lines may indicate transitions between control modes. By adding the random training and neutral commands, the correlation is no longer as strong to the definitive commands removing all or nothing maneuvering and trajectories.

Although the network has been disclosed as having convolutional layers and sensed image inputs, other sensor inputs such as radar or LIDAR sensors and inputs may be used. Additional inputs can be provided via a vehicle CAN or similar internal communication network of the vehicle. Further commands may be expanded beyond simply left, right and straight commands such as reverse or stop as described with respect to FIGS. 4-5. The system may permit a range of operation from full autonomy to partially-supervised, or semi-autonomous driving capabilities.

Deep neural networks have recently been shown to be able to control the steering of an automotive vehicle by learning a mapping between raw image sensor data to steering direction. In accordance with at least one embodiment, the network may operate in an end-to-end manner without any external control over the network's predictions. Although such a network could theoretically be trained on a set of external commands to control the network, such a system would be unable to learn the dynamics of driving. As a result, such raining would be unable to transition smoothly or in a human-like fashion between one command or mode to another command or mode. This technical problem stems from a strong data correlation between commands and output trajectories. More specifically, a single neural network cannot perform different discrete driving tasks using a single type of output (e.g. steering).

Classical approaches to solving such technical obstacles to human-like driving maneuvers by an autonomous vehicle use a modular approach, in contrast to the single end-to-end model used of the presently disclosed embodiments. Such modular approaches consist of multiple modules for each subtask. Some of these modules contain neural network modules that solve a specific subtask related to driving instead of trying to solve the entire problem of driving end-to-end on raw sensor data. For example, a module could output segmented images predicting where in the image it perceives free space, vehicles, trees, pedestrians, etc, whereas another module could be responsible of detecting traffic signs. Use of such a modular approach further requires a rule-based planner that could then plan a trajectory based on the information from these modules for the vehicle to follow. Additionally, in such a configuration, a final module could then elaborate on this trajectory to produce a sequence of steering angles to follow for a smooth drive.

Such conventional modular approaches, however, require extensive tuning and each module must be configured and/or trained carefully. Additionally, the whole system's reliability depends on each module functioning properly. Furthermore, this approach assumes, and requires, a structured environment because it can only account for objects and situations that the original programmer accounted for at system design and data selection phase.

To the contrary, the disclosed embodiments provide a technical solution to these conventional deficiencies by providing a method to control the sometimes unpredictable output of a driving artificial neural network by devising a new training method for driving networks. This approach may be termed "induced confusion mode."

In accordance with disclosed embodiments, this approach involves training the same neural network on all commands separately, and additionally, training the same network on an additional auxiliary random mode or command. This auxiliary random mode may constitute training the network on all other trajectories while keeping this random mode as the control input for the network. This approach teaches the network the overall dynamics of driving under all valid maneuvers, while still maintaining control over which trajectory or maneuver to choose, given an external command. Moreover, this approach enables smooth, human-like steering behavior for the vehicle, while paying attention to dynamics of driving by learning to avoid obstacles and drive within free road space automatically. Although illustrative embodiments are disclosed in terms of a vehicle, the neural network may be trained to direct maneuver other systems or robotic devices.

Disclosed embodiments may include apparatus/systems for performing the operations disclosed herein. An apparatus/system may be specially constructed for the desired purposes, or it may comprise a general purpose apparatus/system selectively activated or reconfigured by a program stored in the apparatus/system.

Disclosed embodiments may also be implemented in one or a combination of hardware, firmware, and software. They may be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM), random access memory (RAM), magnetic disk storage media, optical storage media, flash memory devices including thumb drives and solid state drives, and others.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" or "controller" may comprise one or more processors.

Further, the term computer readable medium is meant to refer to any machine-readable medium (automated data medium) capable of storing data in a format readable by a mechanical device. Examples of computer-readable media include magnetic media such as magnetic disks, cards, tapes, and drums, punched cards and paper tapes, optical disks, barcodes and magnetic ink characters. Further, computer readable and/or writable media may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc.).

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

The invention claimed is:

1. A method for training a monolithic neural network for controlling an autonomous transportation vehicle, the method comprising:
   inputting first and second definitive driving commands into the neural network,
   inputting first and second driving maneuvers corresponding to the first and second definitive driving commands into the neural network with the first and second definitive driving commands as part of a definitive training mode,
   inputting a neutral command into the neural network as part of a random training mode along with the first and second driving maneuvers also used in the definitive training mode,
   wherein the training takes place in real-time and the driving maneuvers are input via manual operation of the transportation vehicle and at least one sensor mounted to the transportation vehicle captures data about the environment surrounding the vehicle and communicate the captured data to the neural network, and
   wherein in the random training mode the vehicle randomly chooses maneuvers it has been trained on and executes the chosen maneuvers if feasible to execute and the neural network automatically learns possible valid driving maneuvers and to identify and follow open road space and avoid obstacles based on the executed maneuvers and data capture during execution of the chosen maneuvers.

2. The method of claim 1 wherein the definitive training mode further comprises inputting a third defined mode command and a third driving maneuver into the neural network, and wherein the random training mode further includes randomly selected third driving maneuvers.

3. The method of claim 1, wherein the driving maneuvers are input via manual operation of the transportation vehicle captured by camera sensors mounted to the transportation vehicle.

4. The method of claim 1 wherein the first definitive driving command is a right turn command and the first driving maneuver is a right turn.

5. The method of claim 4, wherein the second definitive driving command is a left turn command and the second driving maneuver is a left turn.

6. The method of claim 5, wherein during each neutral command, one of right turn and left turn maneuvers are input.

7. The method of claim 6, wherein during each neutral command, one of a plurality of right turn and left turn maneuvers at a plurality of different angles are input.

* * * * *